US010232836B2

(12) United States Patent
Schneider et al.

(10) Patent No.: US 10,232,836 B2
(45) Date of Patent: Mar. 19, 2019

(54) ACTUATOR SYSTEM AND OPERATING METHOD FOR AN ACTUATOR SYSTEM

(75) Inventors: Heinz-Anton Schneider, Niedernhausen (DE); Christof Maron, Kelkheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 431 days.

(21) Appl. No.: 14/127,036

(22) PCT Filed: Jun. 19, 2012

(86) PCT No.: PCT/EP2012/061649
§ 371 (c)(1),
(2), (4) Date: Mar. 6, 2014

(87) PCT Pub. No.: WO2012/175471
PCT Pub. Date: Dec. 27, 2012

(65) Prior Publication Data
US 2014/0196994 A1 Jul. 17, 2014

(30) Foreign Application Priority Data
Jun. 20, 2011 (DE) .................. 10 2011 077 786

(51) Int. Cl.
*B60T 13/00* (2006.01)
*B60T 13/58* (2006.01)
(Continued)

(52) U.S. Cl.
CPC .............. *B60T 13/58* (2013.01); *B60T 7/085* (2013.01); *B60T 8/17* (2013.01); *B60T 13/588* (2013.01);
(Continued)

(58) Field of Classification Search
CPC ........................................................ B60T 7/045
See application file for complete search history.

(56) References Cited

U.S. PATENT DOCUMENTS 6,139,117 A 10/2000 Shirai et al.
6,462,497 B1 10/2002 Rinsma et al.
(Continued)

FOREIGN PATENT DOCUMENTS

CN 102015395 4/2011
DE 100 21 601 A1 11/2001
(Continued)

OTHER PUBLICATIONS

Machine Translation of DE 10 2010 029225 (no date).*
(Continued)

*Primary Examiner* — Nicholas J Lane
(74) *Attorney, Agent, or Firm* — RatnerPrestia

(57) ABSTRACT

The invention relates to an actuator system, in particular an electromechanical parking brake system, comprising an actuator, wherein the actuator is driven by a direct current motor that can be driven in both directions of rotation, wherein a control unit for controlling the movement of the direct current motor in an open-loop or closed-loop manner is provided. The core of the invention is that one or more pieces of information are supplied to a control unit, said information allowing the application force exerted by the electromotive actuator to be determined and compared to a predetermined minimum application force, and wherein the control unit emits at least one piece of information, signal or the like for requesting an auxiliary actuation to peripheral systems, components and/or electronic control units after the target to actual value comparison has shown that the determined, set application force is smaller than the predetermined minimum application force.

16 Claims, 2 Drawing Sheets

(51) Int. Cl.
*B60T 8/17* (2006.01)
*B60T 17/22* (2006.01)
*B60T 7/08* (2006.01)
*B60T 13/74* (2006.01)

(52) U.S. Cl.
CPC ............ *B60T 13/74* (2013.01); *B60T 13/741* (2013.01); *B60T 17/22* (2013.01); *B60T 17/221* (2013.01); *B60T 2270/40* (2013.01)

(56) References Cited

U.S. PATENT DOCUMENTS

| | | | |
|---|---|---|---|
| 7,744,166 B2 | 6/2010 | Leiter et al. | |
| 7,992,691 B2 | 8/2011 | Maron et al. | |
| 8,448,756 B2 | 5/2013 | Knechtges | |
| 2004/0011610 A1* | 1/2004 | Witzler et al. | 188/265 |
| 2006/0267402 A1* | 11/2006 | Leiter et al. | 303/20 |
| 2009/0292434 A1* | 11/2009 | Blaser | B60T 8/885 701/70 |
| 2010/0051395 A1* | 3/2010 | Sano | B60T 1/005 188/162 |
| 2010/0308645 A1* | 12/2010 | Maron et al. | 303/20 |
| 2011/0042171 A1* | 2/2011 | Knechtges | 188/106 F |
| 2011/0153147 A1* | 6/2011 | Watanabe | B60T 7/12 701/31.4 |
| 2011/0224880 A1* | 9/2011 | Baehrle-Miller et al. | 701/70 |
| 2013/0333988 A1* | 12/2013 | Bieltz et al. | 188/152 |
| 2013/0338895 A1* | 12/2013 | Bieltz et al. | 701/70 |
| 2014/0214269 A1* | 7/2014 | Knechtges | 701/34.4 |

FOREIGN PATENT DOCUMENTS

| | | |
|---|---|---|
| DE | 100 61 064 A1 | 6/2002 |
| DE | 699 06 318 T2 | 10/2003 |
| DE | 103 61 042 B3 | 5/2005 |
| DE | 699 28 307 T2 | 7/2006 |
| DE | 10 2010 029 225 A1 | 12/2010 |
| DE | 10 2009 029525 A1 | 3/2011 |
| JP | 2010058536 A * | 3/2010 |
| KR | 20060132710 A | 12/2006 |
| KR | 20100090694 A | 8/2010 |
| KR | 20100104548 A | 9/2010 |

OTHER PUBLICATIONS

International Search Report for PCT/EP2012/061649 dated Oct. 16, 2012.

German Search Report for DE 10 2011 077 786.5 dated Sep. 4, 2012.

Notice of Grounds for Rejection for Korean Application No. 10-2013-7034066, dated May 11, 2018, including English translation, 22 pages.

* cited by examiner

ACTUATOR SYSTEM AND OPERATING METHOD FOR AN ACTUATOR SYSTEM

CROSS REFERENCE TO RELATED APPLICATIONS

This application is the U.S. National Phase Application of PCT International Application No. PCT/EP2012/061649, filed Jun. 19, 2012, which claims priority to German Patent Application No. 10 2011 077 786.5, filed Jun. 20, 2011, the contents of such applications being incorporated by reference herein.

FIELD OF THE INVENTION

The invention relates to an actuator system, especially a service or parking brake, comprising: at least one electronically controlled electromotive actuator; and at least one electronic control unit, which is connected via at least one electric supply line to the actuator, and wherein the control unit is connected to one or to a plurality of switches, senders, sensors S and electric actuating elements and comprises at least one microprocessor with implemented software for performing a regulation strategy for controlled or regulated electrical supply of the actuator, and wherein the actuator system is an electromechanically operated motor vehicle brake system comprising an electrically operated wheel brake for generating a defined application force between friction partners.

BACKGROUND OF THE INVENTION

An electromechanically operated motor vehicle brake having an actuator is known in principle and comprises an electric motor that is controlled by an electronic control unit (ECU). The vehicle brake has an actuating element (brake piston) that acts upon at least one friction lining and can be displaced from a rest position into an actuation position, in which the actuating element applies the friction lining against a friction ring. The actuating element (brake piston) can be operated by an electric motor-gearbox unit. The friction lining can thereby be applied to a friction ring in a regulated manner.

Actuators in motor vehicles, especially actuators for operating motor vehicle brakes, are subjected to very different stresses and operating temperatures. In order to always be able to safely park the vehicle, a defined application force is to be provided which can be performed by a specified, defined application of current to the actuator during control or regulation of the actuator taking into account current operating parameters.

A method for controlling an electrically operated parking brake is known from DE 103 61 042 B3, which is incorporated herein by reference. With this method, the switch-off current of the electric motor is varied to compensate for aging-related and wear-related changes of the application force or changes of the application force because of changes of the resistance and/or the temperature of the electric motor or a loss of efficiency. There is a criticism that in principle the method described above causes a loss of actuator efficiency, while increased power demands are made on other vehicle systems (on-board electrical system).

SUMMARY OF THE INVENTION

An aspect of the invention provides an improved actuator system and a particularly efficient, improved method of operation for an actuator system, which enables a system improvement based on a holistic approach, and thereby enables improved integration within the vehicle.

This aspect is achieved by one or a plurality of items of information is/are supplied to the control unit as input variables, which enable the controller unit to determine the application force exerted by the electromotive actuator and to compare the determined application force with a specified minimum application force, and wherein the control unit emits at least one item of information, signal or similar for demanding a boosting actuation to peripheral systems, components and/or electronic control units, after the target-actual value comparison has shown that the determined application force set by the actuator is smaller than the specified minimum application force. Therefore the control unit is enabled to perform a target-actual value comparison and to demand an auxiliary actuation depending on the result. This is used to reduce the load on a vehicle on-board electrical system.

In a further embodiment of the invention it is provided that information about a hydraulically controlled pressure is supplied from the actuator system to the control unit as an input variable.

Therefore it is proposed that for energy-saving a demand to another energy source for a boost is assessed, and that a demand for a boost is forwarded, altered or revised by the control unit depending on the assessment.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
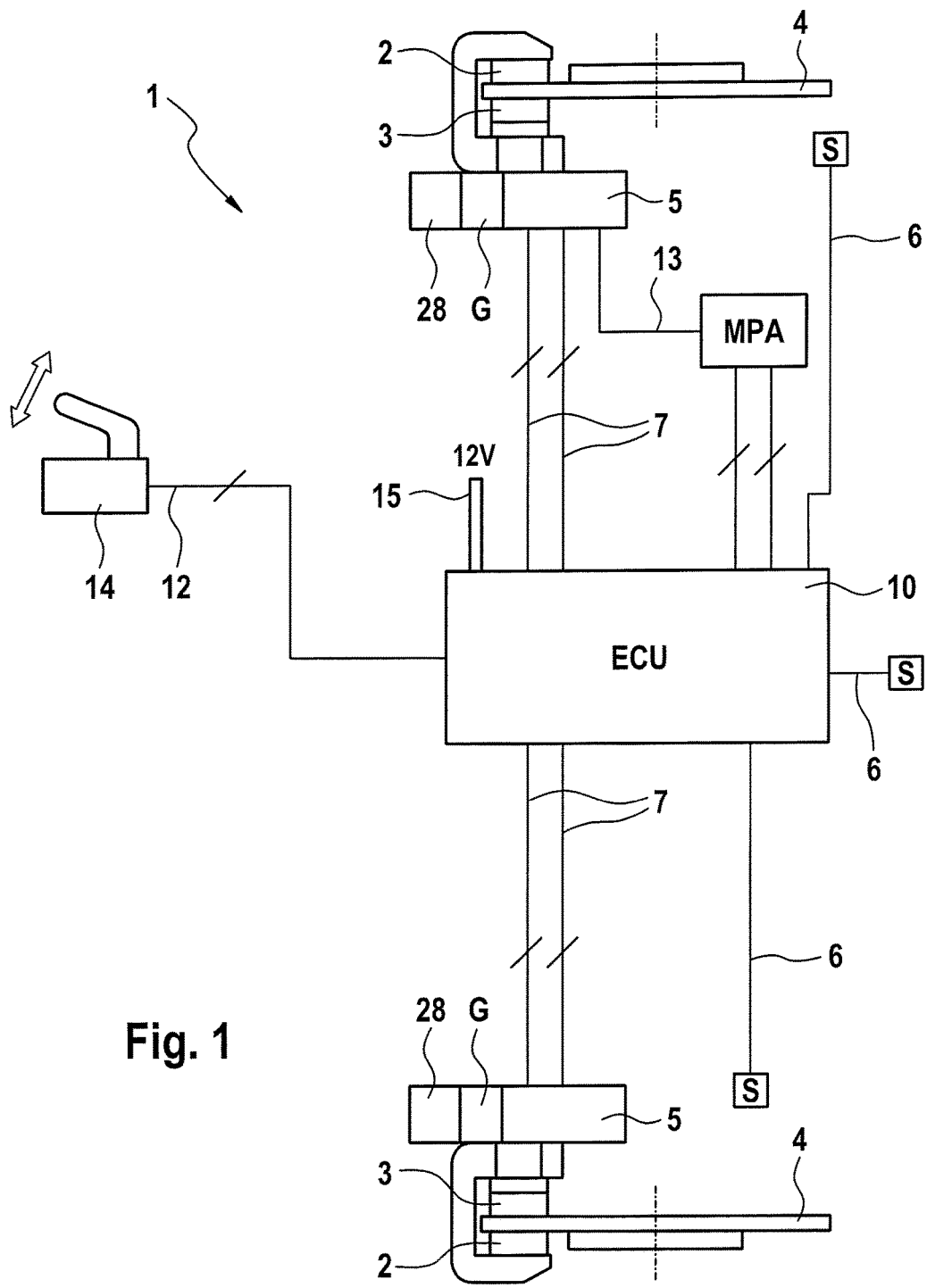
FIG. 1 shows a known brake system comprising components of the parking brake.

A known motor vehicle brake system 1 according to FIG. 1 comprises at least one actuator 5 for each wheel of an axle, each of said actuators being connected via one or a plurality of electric supply lines 7 to a control unit 10. FIG. 1 also shows electrical operation of the control unit 10 via a (possibly multiply-redundant) electric line 12 to the operating switch 14 of the parking brake, with which the application or release of the parking brake can be initiated by the driver of the motor vehicle. The control unit 10 comprises an electric voltage supply 15. Furthermore, the actuators 5 can comprise sensors S, such as in particular temperature sensors, revolution rate sensors, force sensors or similar senders, switches or actuation elements, which are connected to the control unit 10 via additional data lines 6 for information transfer. Each actuator comprises an electric motor 28 and a gearbox G and may comprise a brake caliper housing.

The universal application of an electronically controlled actuator 5 in motor vehicles, as well as the detection of other or additional physical operating variables and characteristics, are readily conceivable without departing from the basic idea of the invention.

Figure 2:
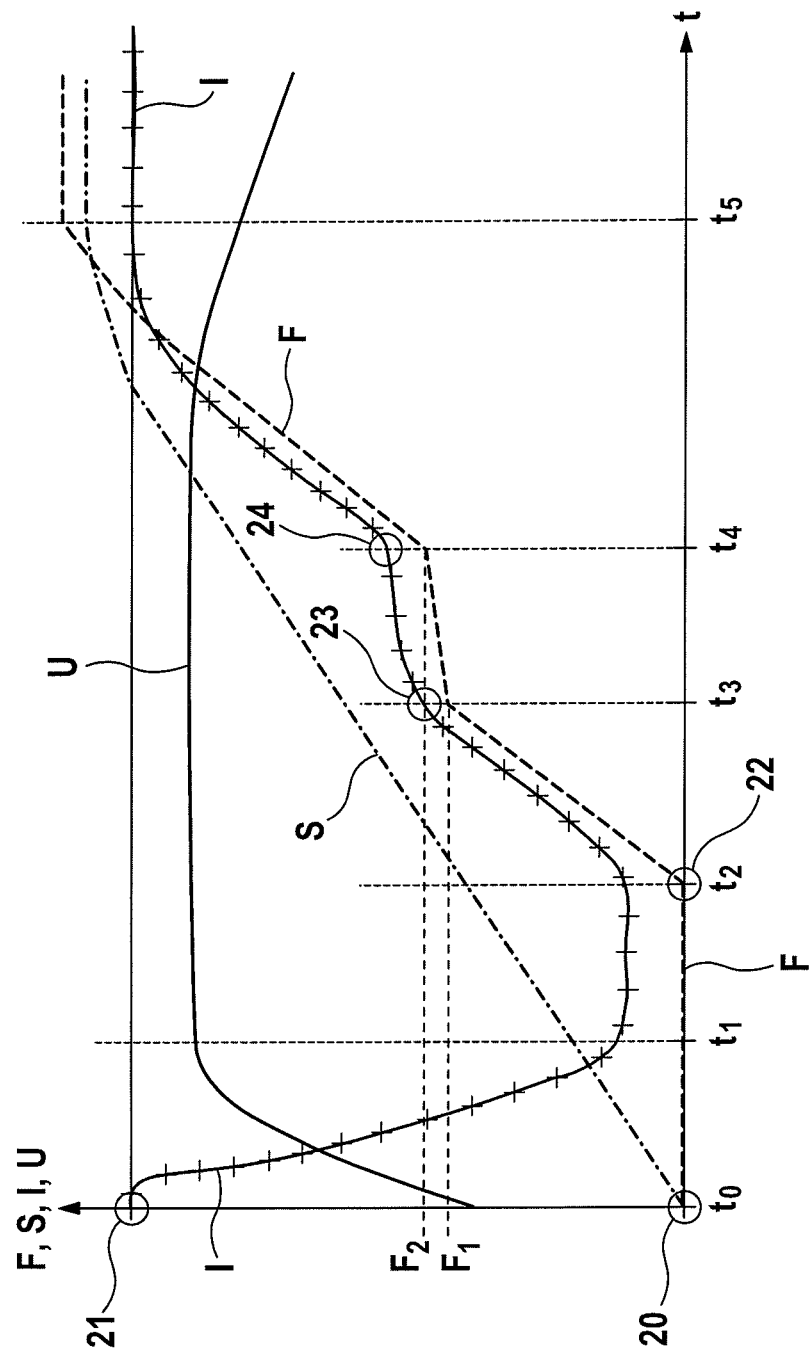
FIG. 2 shows schematically a graph for illustrating the applied motor current I over time t during application.

FIG. 2 illustrates a characteristic profile of an application force F, a position S of a spindle, brake lining 2,3 etc., current consumption I and the voltage U during the application of an actuator 5, in each case over time t. The current consumption I especially is observed in the control unit 10 for this purpose. The application force F is shown as a broken line in FIG. 2, the position S as a dashed-dotted line and the current consumption I of the electromechanical actuator 15 is shown by a concatenation of "+" symbols. Only the applied voltage U is shown in FIG. 2 as a continuous line.

Initially the actuator 5 is in the released state, i.e. the position S is "zero" and the application force F is likewise "zero", as is shown at point 20 at point in time $t_0$. Point 21 illustrates that at the start of an application process a comparatively high run-up current is necessary in order to overcome the mechanical inertia and also to pass from the state of static friction into a state of kinetic friction. At point in time $t_1$ said run-up phase ends and a so-called application phase follows up to point in time $t_2$. At point in time $t_2$ brake linings 2,3 are applied to their friction partners 4 and accordingly the application force F rises with increasing distance s, as is illustrated at point 23. The application force F rises with a first gradient during said application phase up to point in time $t_3$. The current consumption I varies approximately parallel thereto. At point in time $t_3$ the gradient of the application force F bends and the profile of the current consumption I describes a reversal point from point 23, because elasticities such as especially a pre-stressed spring packet with a defined specified spring stiffness are compressed up to point 24. At point in time $t_4$ the application force is large such that the elasticity is completely compressed—into a block. The current consumption I therefore describes a reversal point starting at point in time $t_4$ and follows approximately parallel to the again strongly rising application force F.

At point in time $t_5$ the current consumption I reaches the maximum current level $I_{max}$. At the same time no further displacement or application of brake linings 2,3 occurs and position S also no longer changes after point in time $t_5$. Therefore the generated application force F remains constant after point in time $t_5$, the legally defined application force is reached and the actuator is switched off.

The actuator system construction is designed such that a superimposition of hydraulic energy and (electro-) mechanical energy on brake actuation elements (brake piston) is possible such that electromechanical application force components, electrohydraulic application force components and purely hydraulic application force components can be imposed together. For this reason the invention enables improved actuator control by enabling according to the invention not only the detection of whether and when it is necessary to provide an additional boost from another energy source, but to perform an additional check using at least one target-actual comparison, so that a check will be made as to whether a demand, e.g. for an energy-intensive, electrohydraulic application force build-up, is revised or possibly amended by satisfying the additional energy demand e.g. with mechanical energy of the driver, so that the method enables improved energy management and can protect an on-board electrical system. Before the control unit automatically operates any other energy source to boost the application force, according to the invention an assessment and inspection of the prevailing environmental and general conditions takes place. It can be assessed whether and how the situation can be improved by demands for auxiliary energy by peripheral systems, actuators or the vehicle driver that are intelligent, possibly networked and differently staggered in time. It is consequently verified whether a demand for a boost that is demanded in principle is urgently necessary, or whether and how an amended operation by an ESP system using externally operated electrohydraulic pressure build-up is to be performed. Thus for the purpose of saving energy or protecting electric supplies/on-board electrical systems, it is enabled that a demand for a boost can to some extent be completely rejected. In other words, the invention enables a minimal application force to be adaptively adjusted to a certain extent depending on the vehicle conditions and ambient conditions. Consequently, the invention can also provide that a minimal selected application force is defined according to the demand as a fallback solution when the on-board electrical system is overloaded, the vehicle mass is low and there is a small load in combination with a stopping place with no downward or upward gradient. It is thus possible to adaptively adjust the application force to the mandatory load states while protecting the on-board electrical system. As a result, unnecessary energy consumption is reduced and unnecessary stresses on vehicle components by a continuous load at the level of the legally defined minimal application force are avoided. As a result the energy consumption required for the application processes is reduced and the parking brake system is protected by using a loading according to the demand without degrading safety.

It is possible to provide the target-actual value comparison cyclically-periodically with a specified, constant or variable clocking frequency.

The control unit 10, ECU is provided with a current demand from the actuator 5 as an input variable. For observing and assessing changes, i.e. the (application) behavior of the actuator system against time, the control unit 10, ECU assesses the change against time of the current demand of the actuator 5. In this connection the control unit 10, ECU, for performing the target-actual value comparison, is provided with at least one item of information about the type and scope of a service brake operation, such as especially at least one measured, hydraulic pressure value, in order to determine the total application force. Furthermore, a check is performed as to what extent the measured hydraulic pressure value correlates with a hydraulic pressure in a cylinder, such as especially a master cylinder and/or a wheel brake cylinder. The minimal application force can be provided in an adaptively variable manner such that the electromotive actuator operation is controlled or regulated in an adaptively variable manner depending on a plurality of target-actual value comparisons that are performed in cycles.

The control and regulation processes of the control unit 10, ECU, such as especially a demand for boosting actuation depending on the operating, vehicle and/or peripheral conditions, are performed while controlled or regulated using networking with peripheral components. In particular, the electronic control unit 10, ECU is provided, being networked (bus system) with at least one electronic control unit of a service brake system for transferring and/or exchanging data, signals and similar, and wherein the service brake system can be remotely operated by the electronic control unit (such as a hydraulic actuator). It is possible in this regard that the electronic control unit (10, ECU) specifies at least one target value for the electronic control unit for controlling the hydraulic actuator based on the target-actual value comparison(s). Here it is provided that the target value defines a hydraulic pressure that is implemented by the actuator. The target value can be provided in a fixed stored form or so as to be variably amendable.

With regard to the use of the invention for protecting on-board electrical systems, it is possible that a demand for boosting actuation is terminated or inhibited if the control unit 10, ECU has information that a demand for boosting actuation will not result in achievement of the minimal application force, and wherein the actuator system additionally emits an error message.

The invention can in principle be used for electric parking brakes that comprise integrated brake calipers (integrated here means that a hydraulic force and an electromechanically generated force are acting on a common force transfer element to build up a brake caliper clamping force) and is independent of a specific implementation of the controller (individual controller exclusively for EPB functions or an integrated controller for EPB and ABS/ESP functions) for controlling the electromechanical actuators of the parking brake.

As a matter of principle the invention is, however, suitable for energy management for any actuator or in principle for use with electromechanically operated vehicle brakes.

REFERENCE CHARACTER LIST 1 motor vehicle brake system
2,3 friction partner (friction lining)
4 friction partner (brake disc/friction ring)
5 actuator
6 data line
7 supply line
8 electronic unit (actuator)
9 electronic unit (ECU)
10 control unit (ECU)
11 interference suppression means
12 supply line
13 hydraulic line
14 operating switch
15 voltage supply
20-24 marking points
28 electric motor
MPA Motor Pump Assembly
I current
n revolution rate (actuator activity)
t time
t0 to ti point in time
S Sensor
v temperature
F application force
s distance
U voltage
G gearbox

The invention claimed is:
1. An actuator system for a service or parking brake, comprising:
   at least one electronically controlled electromotive actuator, the electronically controlled electromotive actuator is an electromechanically operated motor vehicle brake system comprising an electrically operated wheel brake for generating a defined application force between friction partners; and
   at least one electronic control unit, including at least one microprocessor with implemented software for performing a regulation strategy for controlled or regulated electrical supply of the electromotive actuator, the electronic control unit connected via at least one electric supply line to the electromotive actuator, and connected to at least one of a plurality of switches, and sensors S,
   wherein the electronic control unit is configured to:
      receive one or more of a plurality of items of information supplied by the sensors S as input variables,
      determine a brake application force exerted by the electromotive actuator based on the one or more of the plurality of items of information,
      compare the determined brake application force with a specified minimum brake application force, and
      emit at least one item of information, or control signal for demanding a brake boosting actuation from a mechanical energy of a driver of the vehicle, when the target-actual value comparison has shown that the determined brake application force set by the electromotive actuator is smaller than the specified minimum brake application force, and
      emit a control signal to boost the brake application force by increasing power to the electromotive actuator when the mechanical energy requested from the driver of the vehicle does not increase the brake application force to the specified minimum, and
   wherein the electronic control unit is implemented as an integral controller for electric parking brake (EPB) and anti-lock braking system/electronic stability program (ABS)/(ESP) functions for controlling the electromechanical actuators of the parking brake.

2. The actuator system as claimed in claim 1, wherein the target-actual value comparison is repeatedly and regularly performed by the control unit in cycles, periodically, with a specified clocking frequency.

3. The actuator system as claimed in claim 1, wherein the demand for a boosting actuation, depending on the target-actual value comparisons in cycles, is continued and emitted in modified form.

4. The actuator system as claimed in claim 1, wherein a current demand from the actuator is supplied to the control unit as an input variable.

5. The actuator system as claimed in claim 4, wherein the control unit detects and observes a change of the current demand from the actuator against time.

6. The actuator system as claimed in claim 1, wherein at least one of the plurality of items of information about the type and scope of a service brake operation is supplied to the control unit for performing the target-actual value comparison to determine a total application force.

7. The actuator system as claimed claim 1, wherein the minimum application force is provided in adaptively variable form, and that the electromotive actuator operation is performed with variable control or regulation depending on a plurality of target-actual value comparisons carried out in cycles.

8. The actuator system as claimed in claim 1, wherein the demand for boosting actuation is implemented with control or regulation depending on the operating, vehicle and/or peripheral conditions.

9. The actuator system as claimed in claim 1, wherein the target value defines a hydraulic pressure that is applied by the actuator.

10. The actuator system as claimed in claim 1, wherein the target value is a defined fixed value.

11. The actuator system as claimed in claim 1, wherein the target value is a variable value.

12. The actuator system as claimed in claim 1, wherein a demand for a boosting actuation is terminated or inhibited if the control unit has information that a demand for boosting actuation does not cause achievement of the minimal application force, and wherein the actuator system additionally emits an error message.

13. The actuator system as claimed in claim 6, wherein one of the plurality of items of information is at least one measured, hydraulic pressure value.

14. The actuator system as claimed in claim 13, wherein the at least one measured hydraulic pressure value correlates with a hydraulic pressure in a cylinder.

15. The actuator system as claimed in claim 14, wherein the cylinder is at least one of a master cylinder and a wheel brake cylinder.

16. An actuator method of an actuator system for a service or parking brake having at least one electronically controlled electromotive actuator, the method comprising:

connecting at least one electronic control unit, including at least one microprocessor with implemented software for performing a regulation strategy for controlled or regulated electrical supply of the electromotive actuator, via at least one electric supply line to the electromotive actuator, and via wires to at least one of one or a plurality of switches, and sensors S;

receive, by the electronic control unit, one or more of a plurality of items of information supplied by the sensors S as input variables;

determine, by the electronic control unit, a brake application force exerted by the electromotive actuator based on the one or more of the plurality of items of information;

compare, by the electronic control unit, the determined brake application force with a specified minimum brake application force; and emit, by the electronic control unit, at least one item of information, or control signal for demanding a brake boosting actuation from a mechanical energy of a driver of the vehicle, when the target-actual value comparison has shown that the determined brake application force set by the electromotive actuator is smaller than the specified minimum brake application force, and emit, by the electronic control unit, a control signal to boost the brake application force by increasing power to the electromotive actuator when the mechanical energy requested from the driver of the vehicle does not increase the brake application force to the specified minimum, wherein the electromotive actuator is an electromechanically operated motor vehicle brake system comprising an electrically operated wheel brake for generating a defined application force between friction partners, and wherein the electronic control unit is implemented as an integral controller for electric parking brake (EPB) and anti-lock braking system/electronic stability program (ABS)/(ESP) functions.

\* \* \* \* \*